United States Patent
Bach et al.

(10) Patent No.: US 6,754,059 B2
(45) Date of Patent: Jun. 22, 2004

(54) MULTI-POLE LOW VOLTAGE CIRCUIT BREAKER WITH ONE CURRENT MEASURING DEVICE PER LINE

(75) Inventors: Michael Bach, Berlin (DE); Detlev Schmidt, Berlin (DE); Michael Sebekow, Berlin (DE); Guenter Seidler-Stahl, Berlin (DE); Ingo Thiede, Berlin (DE); Sezai Tuerkmen, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 79 days.

(21) Appl. No.: 10/182,872
(22) PCT Filed: Jan. 30, 2001
(86) PCT No.: PCT/DE01/00428
§ 371 (c)(1), (2), (4) Date: Aug. 1, 2002
(87) PCT Pub. No.: WO01/57979
PCT Pub. Date: Aug. 9, 2001

(65) Prior Publication Data
US 2003/0001702 A1 Jan. 2, 2003

(30) Foreign Application Priority Data
Feb. 1, 2000 (DE) .......................................... 100 04 833

(51) Int. Cl.[7] ................................................ H02H 3/08
(52) U.S. Cl. ...................... 361/93.1; 361/93.6; 361/111
(58) Field of Search .............................. 361/93.1, 93.5, 361/93.6, 111, 115

(56) References Cited

U.S. PATENT DOCUMENTS

| | | | |
|---|---|---|---|
| 4,013,985 A | 3/1977 | Graham et al. | 336/5 |
| 4,497,992 A | 2/1985 | Kodera et al. | 200/153 |
| 4,641,217 A | * 2/1987 | Morris et al. | 361/45 |
| 4,673,779 A | 6/1987 | Bohnen et al. | 200/146 R |
| D347,623 S | 6/1994 | Suzuki et al. | D13/160 |

FOREIGN PATENT DOCUMENTS

| | | |
|---|---|---|
| DE | 3328785 | 2/1985 |
| DE | 19505812 | 8/1996 |
| DE | 19643607 | 11/1997 |
| DE | 19706019 | 8/1998 |

* cited by examiner

Primary Examiner—Stephen W. Jackson
Assistant Examiner—James A Demakis
(74) Attorney, Agent, or Firm—Harness, Dickey & Pierce, P.L.C.

(57) ABSTRACT

A current measuring device for a multi-pole voltage circuit breaker includes a support body with a through opening for a current conductor for each of the poles and a receiving chamber, surrounding the through opening for secondary components of current sensors and/or current transformers. The support body is essentially plate-like and rectangular and forms part of the rear wall of the circuit breaker. Should Rogowski coils be used as secondary components of a transformer, then adjustable voltage dividers are also mounted on the support body for interdependent adjustment. The multi-pole current measuring device simplifies the production of circuit breakers as approved components.

20 Claims, 2 Drawing Sheets

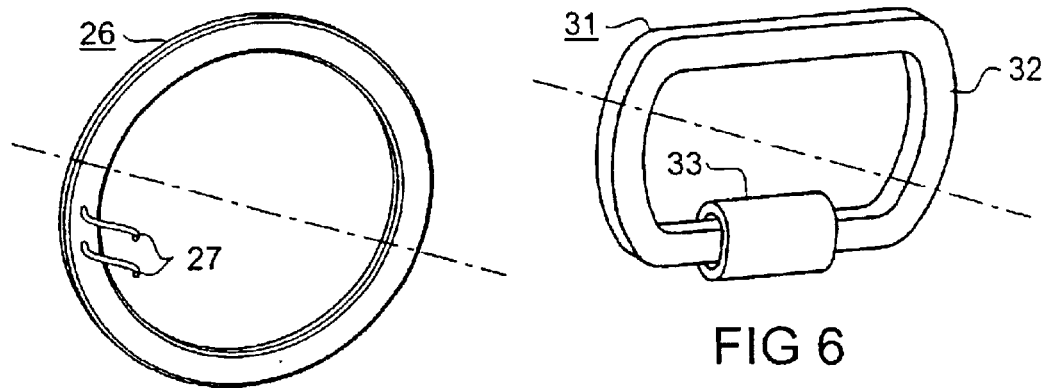
FIG 5
FIG 6
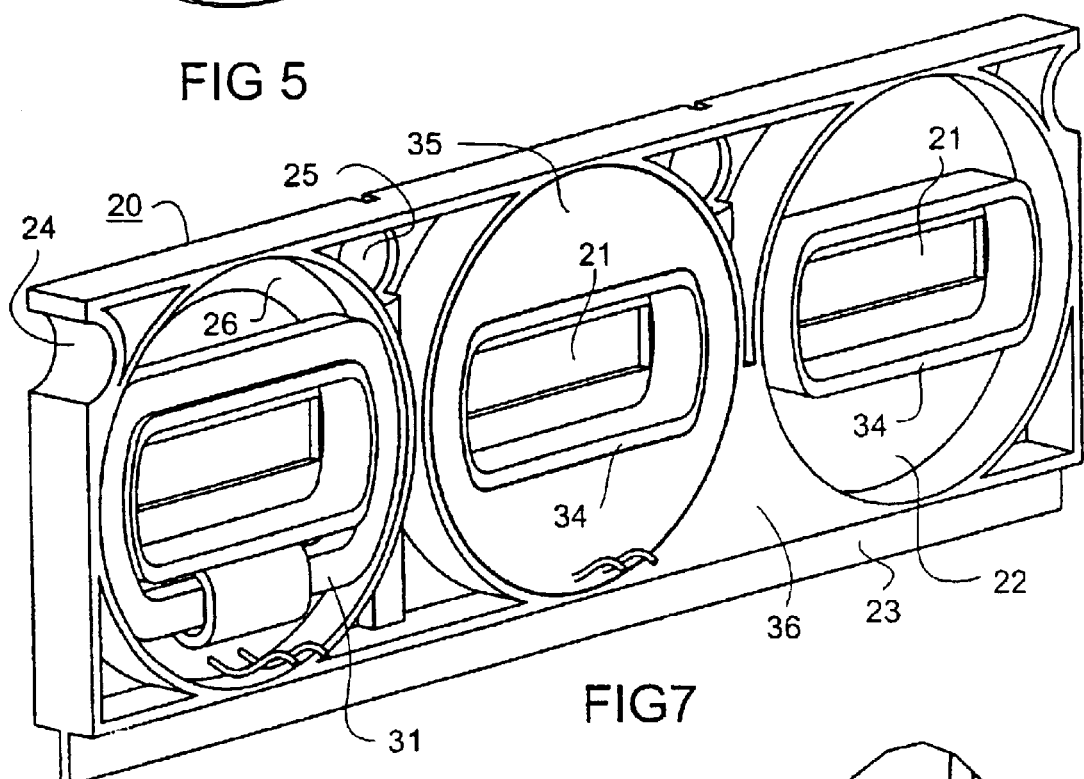
FIG 7
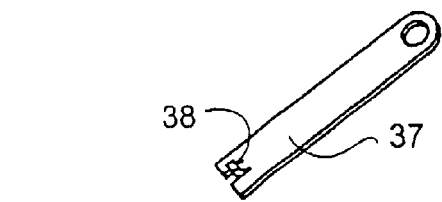
FIG 8
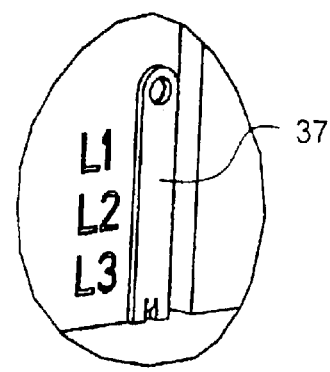
FIG 9 ly relates to a multipole low-voltage
MULTI-POLE LOW VOLTAGE CIRCUIT BREAKER WITH ONE CURRENT MEASURING DEVICE PER LINE This application is the national phase under 35 U.S.C. § 371 of PCT International Application No. PCT/DE01/00428 which has an International filing date of Jan. 30, 2001, which designated the United States of America and which claims priority on German Patent Application No. 100 04 833.1 filed Feb. 1, 2000, the entire contents of which are hereby incorporated by reference.

FIELD OF THE INVENTION

The invention generally relates to a multipole low-voltage circuit breaker having an enclosure and having one current detection device for each pole. Preferably, each current detection device includes an electrical conductor, which is associated with a switching contact system for that pole, and a secondary part through which the electrical conductor passes.

BACKGROUND OF THE INVENTION

Circuit breakers of the stated type have been disclosed, for example, in U.S. Pat. No. 4,673,779 or U.S. Pat. No. D 347,623 (Design Patent) in conjunction with U.S. Pat. No. 4,497,992. The current detection devices provided therein have the object of producing a signal which is dependent on the current flowing in each of the poles and which is evaluated in an overcurrent tripping device, in order to interrupt a circuit for protection of loads and electrical systems. Since, in some circumstances, only one of the poles of a circuit breaker may be affected by a high fault current, each of the poles is equipped with a current detection device.

The secondary parts of the current detection devices generally include a mount and a winding which is fit to it and which may be a single-layer winding or a multilayer winding. Furthermore, these components are generally provided with an enclosure or a casing for protection against damage and against external influences. During the process of manufacturing a low-voltage circuit breaker, the secondary parts of the current detection devices are selected and mounted individually in accordance with the user's requirements. Suitable recesses or pockets are provided for this purpose on the rear face of the enclosure of the circuit breakers, through which the electrical conductors which are connected to the switching contact systems extend, and at the same time form connecting devices for connection to a circuit that is to be protected.

Once the secondary parts have been pushed onto the electrical conductors, suitable sealing covers are fit to the rear face of the enclosure. This is done in order firstly to protect the secondary parts of the current detection devices, and in order secondly to support the electrical conductors on the enclosure of the circuit breaker, as close as possible to their connection point. The reason for this measure is that circuit breakers of the type mentioned are subject to extraordinarily high mechanical forces in the event of a short circuit, which can lead to damage to the circuit breaker and to the conductors continuing on from them if busbars are not adequately supported.

SUMMARY OF THE INVENTION

An embodiment of the invention includes an object of improving the current detection in multi-pole low-voltage circuit breakers, and/or of simplifying the installation of the current detection devices.

According to an embodiment of the invention, an object may be achieved in that the secondary parts of the current detection devices for all the poles of the circuit breaker are arranged in a common mounting body, which has aperture openings for the electrical conductors as well as attachment devices for detachable connection of the mounting body to the enclosure of the circuit breaker.

The combination, as envisaged according to an embodiment of the invention, of the secondary parts of the current detection devices of all the poles to form a standard assembly makes it possible to provide units, which are matched to one another and are tested together, for current detection in multi-pole circuit breakers. This reduces the time required for mechanical installation and calibration and adjustment of the completed circuit breaker. The multi-pole mounting body at the same time improves the mechanical strength, by supporting the electrical conductors in a cohesive body.

The mounting body which is provided according to an embodiment of the invention may have recesses for holding the secondary parts, with these secondary parts being mounted in the recesses by encapsulating them with a synthetic resin compound. It is thus possible to use the same materials and production methods not only for production of the mounting body but also for the attachment of the secondary parts, as those which are already known for the production of the enclosures and of enclosure parts of circuit breakers, and of the associated single-pole current detection devices.

For the purpose of an embodiment of the invention, the mounting body, which essentially has a rectangular outline and is in the form of a panel may be configured as part of a rear wall of the enclosure of the circuit breaker, with the recesses which have been mentioned being arranged on that side of the mounting body which faces the interior of the circuit breaker. This arrangement provides good protection for the secondary parts against damage during handling of the circuit breaker and has a good protective effect on the electrical conductors which are associated with the current detection devices.

As already mentioned, the current detection devices for low-voltage circuit breakers may be of widely differing types. One frequently used type is the transposed conductor current transformer, which has a nonmagnetic mount surrounding the electrical conductor and has a single-layer winding, whose start and end are directly adjacent to one another. The output variable from a current sensor such as this is, in contrast to inductive current transformers, dependent not only on the number of turns, but also on their geometrical distribution and arrangement.

According to one refinement of an embodiment of the invention, in this context, it is possible to compensate for the different transmission response of the transposed conductor current transformer resulting from manufacturing tolerances by each of the transposed conductor current transformers having an associated voltage divider, which is composed of resistors, and by these voltage dividers likewise being fit to the mounting body. The adjustment of the transposed conductor current transformers can therefore be carried out before they are installed in a circuit breaker, which represents a simplification in comparison to the previously required matching and calibration of the completed circuit breaker.

The voltage dividers which have been mentioned may each be configured such that they can be adjusted by means of an adjustment element, with all the adjustment elements being arranged in an accessible manner on the rearward face of the mounting body. The current transformers and current sensors can thus be adjusted conveniently during the production process. However, in order to ensure that the adjustment which has been carried out is maintained in all circumstances, it is recommended that it be possible to protect the adjustment elements against inadvertent operation by use of an access barrier, which can be fit once the adjustment process has been carried out. In this case, an encapsulation compound which covers each of the adjustment elements is particularly suitable for use as the access barrier.

As already mentioned, the current detection devices in a low-voltage circuit breaker provide output variables which are processed in a tripping device. The auxiliary energy which is required for operation of such a tripping device is generally likewise obtained from the electrical conductors of the circuit breaker by a current transformer. In this case, it has frequently been found to be expedient to provide a separate current transformer, which is independent of the described current detection devices, in order to provide the auxiliary energy. In this context, it is already known for a current sensor which is provided only for measurement purposes, and for an inductive current transformer, which is used to provide auxiliary energy, to be arranged in a common enclosure. For the purposes of an embodiment of the invention, this method of construction can also be used in a multi-pole mounting body, in such a way that a least one separate current transformer, which is used for supplying power, is arranged on the common mounting body.

BRIEF DESCRIPTION OF THE DRAWINGS

The invention will be explained in more detail in the following text with reference to the exemplary embodiment which is illustrated in the figures.

FIG. 5 shows a sensor coil, without an iron core, for a transposed conductor current transformer, while FIG. 6 shows the secondary part of an auxiliary current transformer, as individual parts of a current detection device.

Figure 2:
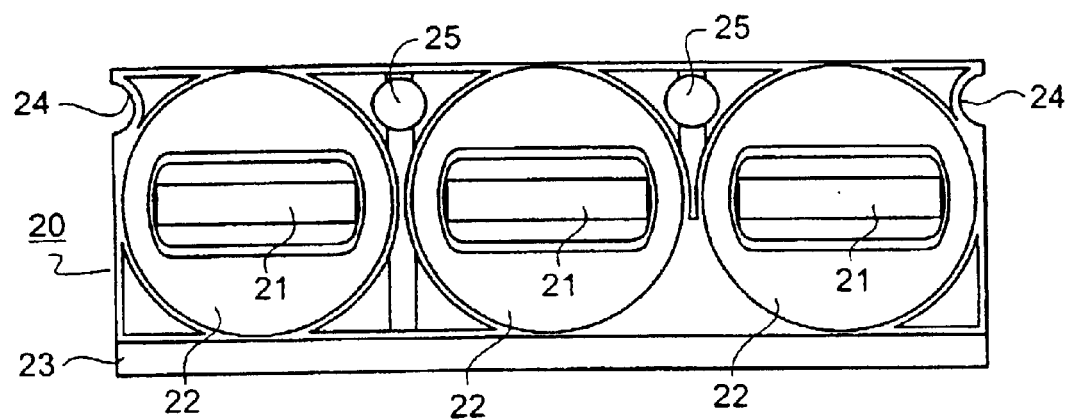
FIG. 2 shows a mounting body, which is intended for a three-pole circuit breaker, for current detection devices, with a view of the inside facing the interior of the circuit breaker, while the mounting body is shown from its outside in FIG. 3, and is shown in profile in FIG. 4.
Figures 3, 4:
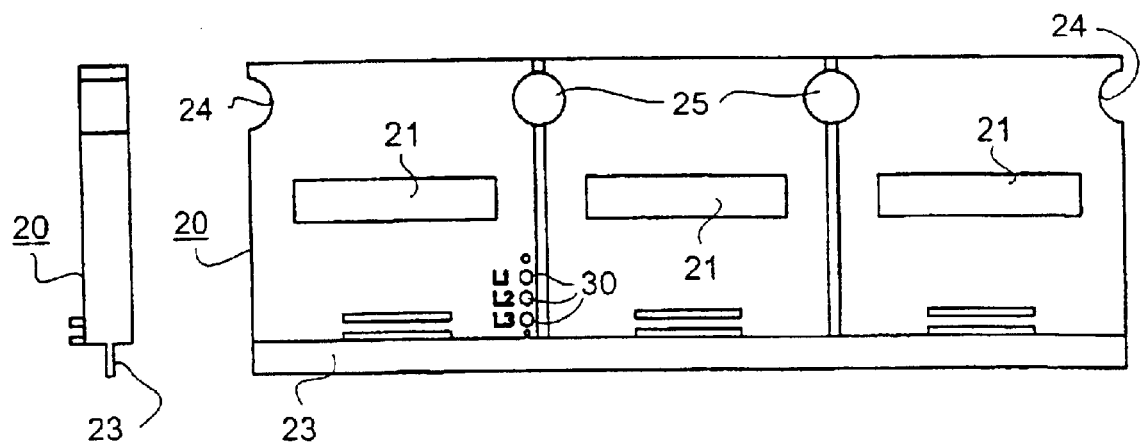

The three-pole mounting body which has already been illustrated in FIGS. 2, 3 and 4 is shown in the form of a perspective illustration in FIG. 7, showing the secondary parts of a current sensors and auxiliary current transformers arranged in holding chambers in the mounting body.

FIGS. 8 and 9 show details of one embodiment of a current detection device, with adjustment elements and an access barrier for these adjustment elements.

DETAILED DESCRIPTION OF THE PREFERRED EMBODIMENTS

Figure 1:
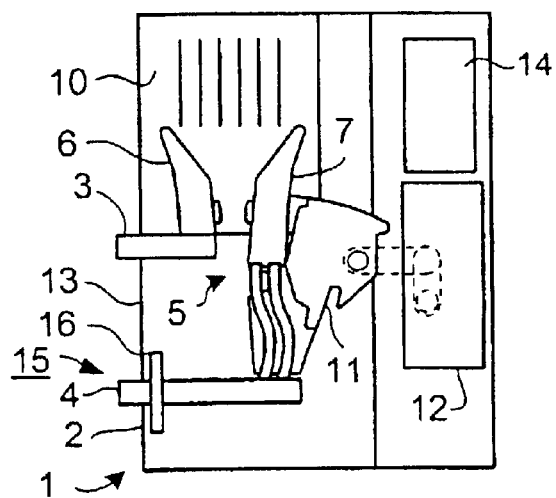
FIG. 1 shows a multi-pole low-voltage circuit breaker schematically and in the form of a section.

The low-voltage circuit breaker 1 which is shown schematically in FIG. 1 has an enclosure 2, on whose rear wall 13 busbars 3 and 4 project, for connection to an external circuit. The busbars 3 and 4 are part of a switching contact system 5 which has a stationary switching contact 6 as well as a movable switching contact 7. An arc-quenching chamber 10, for quenching switching arcs that occur when the switching contacts 6 and 7 are open, is located above the switching contact system 5. The movable switching contact 7 is fit to a movable contact mount 11, which can be operated for opening and closing by use of a drive apparatus 12. The electrical conductors 3 and 4 are connected directly to the switching contact arrangement 5 and are supported on a rear wall 13 of the enclosure 2 with respect to all the forces that occur. The opening of the switching contact arrangement 7 in the event of a fault is controlled by a tripping device 14, which is indicated above the drive apparatus 12.

For this purpose, the tripping device 14 receives signals from a current detection device 15 whose primary part includes the lower electrical conductor 4, which is surrounded by a secondary part 16 of a current sensor. This may, in a known manner, be an inductive current transformer, a current transformer without an iron core based on a transposed conductor coil, as well as the sensors which act on the basis of other known principles. For the present purposes, the components of a current detection device also include auxiliary current transformers which are provided, in a known manner, for supplying the operating power or auxiliary power to the electronic tripping device 14.

FIGS. 2, 3 and 4 show how the secondary parts 16 are arranged and accommodated in a three-pole version of the circuit breaker 1. A key feature for the arrangement of the secondary parts 16 according to an embodiment of the invention is a mounting body 20 which is common to all the poles that there are in the circuit breaker 1 and may be composed of a molded material, such as that which is also used to produce enclosure parts for the circuit breaker 1. The mounting body 20 has a suitable rectangular aperture opening 21 for the upper electrical conductors 3 of each pole of the circuit breaker 1. As can he seen in particular in FIG. 3, this aperture opening 21 lies in the plane of the rear wall 13 of the enclosure 2 of the circuit breaker 1, so that the support for the busbars 3 is removed as far as possible from the stationary switching contact 6, thus resulting in a good supporting effect. Each of the aperture openings 21 is surrounded by a holding chamber 22, which is used to hold the secondary parts 16 of the current detection devices 15. As already mentioned, current transformers may also be accommodated in the holding chambers 22, and are used to supply power to the tripping device 14.

For attachment to the rear face of the circuit breaker 1, the mounting body 20 has on its lower longitudinal edge a web 23, with a corresponding groove being provided on the rear wall 13 of the circuit breaker 1 in order to hold this web 23. Recesses 24 on the edges and aperture openings 25 between the poles on the longitudinal edge of the mounting body 20 opposite the web 23 are provided for attachment devices, in particular for screws which engage in the enclosure 2. In conjunction with the web 23, this results in the mounting body 20 being held securely on the rear wall 13 of the enclosure 2 (FIG. 1).

As an example of a current sensor, FIG. 5 shows a transposed conductor coil 26 with connecting lines 27 indicated, which corresponds to the secondary part 16 in FIG. 1. A coil such as this supplies a signal which can be evaluated electronically, in order to control the tripping device 14 which has been mentioned. This requires auxiliary power in order to make it possible to carry out the necessary evaluation and calculation processes and, when necessary, to operate a tripping magnet. A separate auxiliary current transformer with a secondary part 31 is provided, as shown in FIG. 6, in order to provide this auxiliary power, and its primary winding is formed by the associated electrical conductor 4 of the circuit breaker 1 (FIG. 1), as in the case of the transposed conductor coil 26. The secondary part 31 which is shown in FIG. 6 has an iron core 32 and a secondary winding 33 seated on it. An electrical conductor which is used for the primary winding is indicated by dashed-dotted lines, for simplicity, in FIGS. 5 and 6.

FIG. 7 shows how the secondary parts as shown in FIGS. 5 and 6 are accommodated in the holding chambers 22 of the mounting body 20. The right-hand one of the holding chambers 22 will be considered first of all. As can be seen, the holding chamber 22 has a hollow-cylindrical exterior and is matched to the diameter of the transposed conductor coil 26. The inner boundary of the holding chamber is formed by a collar 34, which surrounds the aperture opening 21.

The left-hand part of FIG. 7 shows a state which occurs during the manufacture of a current detection device 15, in which a transposed conductor coil 26 and a secondary part 31 of an auxiliary current transformer are introduced into a holding chamber 22. The transposed conductor coil 26 in this case touches the bottom of the holding chamber 22, and is aligned on its hollow-cylindrical circumferential surface. The secondary part 31 of the auxiliary current transformer, which is seated on the collar 34, is located above this.

Although it would be possible to mount the coil arrangements in the holding chambers 22 by use of a cover which can be connected to the mounting body 20, encapsulation with a synthetic resin compound is preferred. This encloses the coils and connecting lines on the secondary parts, and thus provides good protection against all external influences. Such encapsulation with a synthetic resin compound 35 is illustrated in the central part of FIG. 7.

FIG. 7 also shows that a lower region 36 of the mounting body 20 is configured in a closed manner between the central holding chamber and the right-hand holding chamber 22. The adjustment elements 30 (FIG. 3) for the voltage dividers which are associated with the current sensors and the transposed conductor coils 26 are located in this area. These adjustment elements 30 need be adjusted only once, once the current detection device 15 has been completed. In order to avoid random operation subsequently, an access barrier 37 may be provided, as shown in FIGS. 8 and 9. This is a cover which is attached by use of a screw, for example, that is prevented from rotating by a tab 38, for example.

The combination of the secondary parts of the current sensors and auxiliary current transformers of all the poles of a circuit breaker results in an assembly which is ready for installation and is electrically adjusted. The calibration of the secondary parts, and a complete test of a multi-pole current detection device, may be carried out before installation in the circuit breaker, which represents a considerable simplification. This reliably avoids faults, for example as a result of confusion between previously selected secondary parts that have been provided. This also ensures that all the secondary parts are arranged at a defined distance from one another, which cannot be varied, and that subsequent faults and tolerance problems are precluded.

The invention being thus described, it will be obvious that the same may be varied in many ways. Such variations are not to be regarded as a departure from the spirit and scope of the invention, and all such modifications as would be obvious to one skilled in the art arc intended to be included within the scope of the following claims.

What is claimed is:

1. A multi-pole low-voltage circuit breaker, comprising:
    an enclosure;
    a current detection device for each pole of the circuit breaker, with each current detection device including, an electrical conductor, associated with a switching contact system for that pole, as a primary part, and a secondary part, through which the electrical conductor passes, wherein
    the secondary parts of the current detection devices for the poles of the circuit breaker are arranged in a common mounting body including
    aperture openings for the electrical conductors and attachment elements for detachable connection of the mounting body to the enclosure of the circuit breaker.

2. The low-voltage circuit breaker as claimed in claim 1, wherein the mounting body includes holding chambers for holding the secondary parts.

3. A low-voltage circuit breaker as claimed in claim 2, wherein the mounting body includes an essentially rectangular outline and is in the form of a panel, and wherein the mounting body is configured as part of a rear wall of the enclosure of the circuit breaker, and wherein the holding chambers are arranged on that side of the mounting body which faces an interior of the circuit breaker.

4. The low-voltage circuit breaker as claimed in claim 1, wherein
    when using transposed conductor coils, each of the coils includes an associated voltage divider composed of resistors, and wherein the voltage dividers are fit to the mounting body.

5. The low-voltage circuit breaker as claimed in claim 4, wherein
    each voltage divider is configured such that it can be adjusted by adjustment element, and wherein the adjustment elements are arranged in an accessible manner on the externally accessible side of the mounting body.

6. The low-voltage circuit breaker as claimed in claim 5, wherein the adjustment elements are protected against inadvertent operation by an access barrier, fit once an adjustment process has been carried out.

7. The low-voltage circuit breaker as claimed in claim 6, wherein the access barrier is formed by an encapsulation compound which covers each of the adjustment elements.

8. The low-voltage circuit breaker as claimed in claim 1, further comprising:
    at least one separate current transformer, for supplying power to a tripping device for the circuit breaker, arranged on the common mounting body.

9. The low-voltage circuit breaker as claimed in claim 1, wherein the holding chambers include recesses, and wherein that the secondary 1arts are mounted in the recesses by encapsulating them with a synthetic resin compound.

10. A low-voltage circuit breaker as claimed in claim 1, wherein the mounting body includes an essentially rectangular outline and is in the form of a panel.

11. A low-voltage circuit breaker as claimed in claim 10, wherein the mounting body is configured as part of a rear wall of the enclosure of the circuit breaker.

12. The low-voltage circuit breaker as claimed in claim 2, wherein, when using transposed conductor coils, each of the coils includes an associated voltage divider composed of resistors, and wherein the voltage dividers are fit to the mounting body.

13. The low-voltage circuit breaker as claimed in claim 3, wherein, when using transposed conductor coils, each of the coils includes an associated voltage divider composed of resistors, and wherein the voltage dividers are fit to the mounting body.

14. The low-voltage circuit breaker as claimed in claim 12, wherein each voltage divider is configured such that it can be adjusted by an adjustment element, and wherein the adjustment elements are arranged in an accessible manner on the externally accessible side of the mounting body.

15. The low-voltage circuit breaker as claimed in claim 14,
wherein the adjustment elements are protected against inadvertent operation by an access barrier, fit once an adjustment process has been carried out.

16. The low-voltage circuit breaker as claimed in claim 15,
wherein the access barrier is formed by an encapsulation compound which covers each of the adjustment elements.

17. The low-voltage circuit breaker as claimed in claim 13,
wherein each voltage divider is configured such that it can be adjusted by an adjustment element, and wherein the adjustment elements are arranged in an accessible manner on the externally accessible side of the mounting body.

18. The low-voltage circuit breaker as claimed in claim 17,
wherein the adjustment elements are protected against inadvertent operation by an access barrier, fit once an adjustment process has been carried out.

19. The low-voltage circuit breaker as claimed in claim 18,
wherein the access barrier is formed by an encapsulation compound which covers each of the adjustment elements.

20. The low-voltage circuit breaker as claimed in claim 1, further comprising;
at least one separate current transformer, for supplying power to a tripping device for the circuit breaker, arranged on the common mounting body.

* * * * *